United States Patent Office 3,154,483
Patented Oct. 27, 1964

3,154,483
OXIDATION OF MERCAPTANS
Peter Urban, Northbrook, Ill., assignor to Universal Oil Products Company, Des Plaines, Ill., a corporation of Delaware
No Drawing. Filed Feb. 20, 1963, Ser. No. 260,041
14 Claims. (Cl. 208—206)

This invention relates to the oxidation of mercaptans. In one embodiment it is directed to the oxidation of mercaptans contained in hydrocarbon distillates. In another embodiment, it is used for effecting regeneration of alkaline solutions which previously had been used to extract acidic components from organic substrates and particularly hydrocarbon distillates. In still another embodiment it is used for the oxidation of mercaptans derived from any suitable source.

A very effective catalyst for accomplishing the oxidation of mercaptans, including mercaptans contained in hydrocarbon distillates or mercapto compounds contained in used alkaline solutions, is a metal phthalocyanine, details of which will be hereinafter set forth. While this catalyst is very active, it always is desired to accelerate the oxidation reaction. In addition to accelerating the oxidation reaction of readily oxidizable mercaptans, it is desired to improve the process to effect oxidation of the difficultly oxidizable mercaptans. In general, the more difficultly oxidizable mercaptans are the higher boiling mercaptans which, for example, are contained in higher boiling hydrocarbon distillates including kerosene, jet fuel, aromatic solvent, stove oil, range oil, gas oil, diesel fuel, fuel oil, lubricating oil, etc. Accordingly, the present invention offers the twofold advantage of (1) accelerating oxidation of readily oxidizable mercaptans as contained in gasoline, naphtha, normally gaseous hydrocarbon fractions, etc., and of (2) both accelerating oxidation of readily oxidizable mercaptans and effecting oxidation which otherwise may not occur of the difficultly oxidizable mercaptans contained in the higher boiling distillates hereinbefore set forth. In another embodiment the novel features of the present invention may be utilized for purifying other organic fractions containing certain acidic impurities, the other organic compounds including alcohols, ketones, aldehydes, etc.

In one embodiment the present invention relates to a process for oxidizing a mercaptan which comprises reacting said mercaptan with an oxidizing agent in the presence of a phthalocyanine catalyst and a hydrophilic mercapto compound.

In another embodiment, the present invention relates to a method of treating a sour hydrocarbon distillate which comprises reacting said distillate with air in the presence of an alkaline reagent, cobalt phthalocyanine sulfonate and mercaptoethanol.

In still another embodiment the present inventon relates to a method of regeneratng used caustic solution which comprises reacting the same with air in the presence of vanadium phthalocyanine sulfonate and mercaptoethanol.

Any suitable phthalocyanine catalyst is used in the present invention and preferably comprises a metal phthalocyanine. Particularly preferred metal phthalocyanines comprise cobalt phthalocyanine and vanadium phthalocyanine. The metal phthalocyanine in general is not readily soluble in aqueous solutions and, therefore, for improved operation is preferably utilized as a derivative thereof. A preferred derivative is the sulfonated derivative. Thus, a particularly preferred phthalocyanine catalyst comprises cobalt phthalocyanine sulfonate. Such a catalyst comprises cobalt phthalocyanine disulfonate and also contains cobalt phthalocyanine monosulfonate. Another preferred catalyst comprises vanadium phthalocyanine sulfonate. These compounds may be obtained from any suitable source or may be prepared in any suitable manner as, for example, by reacting cobalt or vanadium phthalocyanine with 20% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

As hereinbefore set forth, while the phthalocyanine catalyst is very active, it is desirable to even further accelerate the oxidation reaction. This has the important advantage of reducing the contact time required for accomplishing the desired oxidation and thereby permits increased capacity and/or less plant equipment. In addition, the present invention effects oxidation of difficultly oxidizable mercaptans which normally are not oxidized in the presence of the phthalocyanine catalyst but in the absence of the hydrophilic mercapto compound. Another advantage to the features of the present invention is that the undesired discoloration which sometimes occurs in the oxidation of high boiling mercaptans is reduced when the oxidation is effected in the presence of the hydrophilic mercapto compound.

Any suitable hydrophilic mercapto compound is used in accordance with the present invention. The hydrophilic mercapto compound contains a mercapto group and a hydrophilic group including, for example, OH, COOH, $SO_3H$, etc. A particularly preferred hydrophilic mercapto compound is mercaptoethanol. Other mercaptoalkanols include mercaptopropanol, mercaptobutanol, mercaptopentanol, mercaptohexanol, etc. Still other hydrophilic mercapto compounds include thioglycolic acid, thiohydracrylic acid, etc., mercaptomalonic acid, mercaptosuccinic acid, mercaptoglutaric acid, etc., thiophenol sulfonic acid, mercapto sulfo succinic acid, mercapto sulfo glutaric acid, mercapto sulfo adipic acid, mercapto sulfo pimelic acid, etc. It is understood that the different hydrophilic mercapto compounds are not necessarily equivalent, but all of them will serve to accelerate oxidation of mercaptans.

Without the intention of being limited thereto, it is believed that during the course of the reaction, all or a portion of the hydrophilic mercapto compound may undergo reaction to form the corresponding disulfide as, for example, mercaptoethanol forming beta-hydroxyethyl disulfide. However, the disulfide disproportionates to the original mercapto compound and a thioaldehyde or thioacetal. Accordingly, in another embodiment of the invention, the disulfide of the hydrophilic mercapto compound may be introduced into the process, alone or in admixture with the hydrophilic mercapto compound, in order to obtain acceleration of the mercaptan oxidation reaction.

In a preferred embodiment, oxidation of the mercaptan is effected in the presence of an alkaline solution. As hereinbefore set forth, another embodiment of the invention comprises regeneration of alkaline solutions which have been used to extract acidic components from organic substrates and particularly hydrocarbon distillates. Any suitable alkaline reagent is employed. A preferred reagent comprises an aqueous solution of an alkali metal hydroxide such as sodium hydroxide (caustic), potassium hydroxide, etc. Other alkaline solutions include aqueous solutions of lithium hydroxide, rubidium hydroxide, cesium hydroxide, etc., although, in general, these hydroxides are more expensive and therefore usually are not preferred for commercial use. Preferred alkaline solutions are aqueous solutions of from about 1% to about 50% and more particularly from about 5% to about 25% by weight concentration of the alkali metal hydroxide. While water is the preferred solvent, it is understood that other suitable solvents may be used including, for example, alcohols, ketones, etc., and preferably aqueous mixtures of these solvents.

The hydrophilic mercapto compound and phthalocyanine catalyst generally are used in small concentrations. These concentrations are best expressed in terms related to the alkaline reagent. Accordingly, the phthalocyanine catalyst is used in a range of from 5 to 1000 and preferably from 10 to 100 parts per million by weight of the active alkaline reagent in the solution, although lower or higher concentrations may be used in some cases. In general, the use of higher concentrations is unnecessary but, if desired, may range up to 25% or more by weight of the active alkaline reagent. The concentration of hydrophilic mercapto compound will be within the range of from 5 to 1000 and preferably from 10 to 100 parts per million by weight of the active alkaline reagent in the solution although, here again, lower or higher concentrations may be used and may range up to 25% or more by weight of the active alkaline reagent.

It appears that the hydrophilic mercapto compound becomes consumed in the course of the process. Accordingly, it is desirable to introduce, either continuously or intermittently, additional hydrophilic mercapto compound during the course of the process. Similarly, it is within the scope of the invention to introduce, either continuously or intermittently, additional phthalocyanine catalyst during the course of the process.

Treating of the sour hydrocarbon distillate is effected by oxidation of mercaptans. Accordingly, an oxidizing agent is present in the reaction. Air is preferred, although oxygen or other oxygen-containing gas may be utilized. In some cases the sour petroleum distillate may contain entrained oxygen or air in sufficient concentration to accomplish the desired sweetening, but generally it is preferred to introduce air into the reaction. The amount of air must be sufficient to effect oxidation of mercaptans, although a moderate excess thereof generally is not objectionable.

Oxidation of mercaptans, sweetening of the hydrocarbon distillate and regeneration of the used alkaline solution in the presence of the phthalocyanine catalyst and hydrophilic mercapto compound is effected at any suitable temperature which may range from ambient (50–90° F.) to 200° F. when operating at atmospheric pressure or up to 400° F. or more when operating at superatmospheric pressure. In general, it is preferred to utilize a slightly elevated temperature which may range from about 100° F. to about 175° F. Atmospheric pressure or superatmospheric pressure, which may range up to 1000 pounds or more, may be used.

Treatment of the petroleum distillate is effected in any suitable manner and may be in a batch or continuous process. In a batch process the sour hydrocarbon distillate is introduced into a reaction zone containing the phthalocyanine catalyst, alkaline reagent and hydrophilic mercapto compound, and air is introduced therein or passed therethrough. Preferably the reaction zone is equipped with suitable stirrers or other mixing devices to obtain intimate mixing. In a continuous process the caustic solution containing phthalocyanine catalyst and hydrophilic mercapto compound is passed counter-currently to or concurrently with the sour petroleum distillate in the presence of a continuous stream of air. In a mixed type process, the reaction zone contains the alkaline solution, hydrophilic mercapto compound and phthalocyanine catalyst, and the sour distillate and air are passed continuously therethrough and removed, generally from the upper portion of the reaction zone.

In another embodiment of the invention, the catalyst is disposed as a fixed bed in the oxidation zone and the mercaptan, hydrocarbon distillate or other substrate containing the mercaptan is passed, together with alkaline solution and hydrophilic mercapto compound, at the desired temperature and pressure, into contact with the catalyst in either upward or downward flow. In this embodiment, the catalyst is prepared as a composite with a solid support. Any suitable support may be employed and preferably comprises activated charcoal, coke or other suitable forms of carbon. In some cases the support may comprise silica, alumina, magnesia, etc., or mixtures thereof. The solid catalyst is prepared in any suitable manner. In one method, preformed particles of the solid support are soaked in a solution containing the catalyst, after which excess solution is drained off and the catalyst is used as such or is subjected to a drying treatment, mild heating, blowing with air, hydrogen, nitrogen, etc., or successive treatments using two or more of these treatments prior to use. In other methods of preparing the solid composite, a solution of the phthalocyanine catalyst may be sprayed or poured over the particles of the solid support, or such particles may be dipped, suspended, immersed or otherwise contacted with the catalyst solution. The concentration of phthalocyanine catalyst in the composite may range from 0.1% to 10% by weight or more of the composite.

Regardless of the particular operation employed, the products are separated to recover disulfides and/or hydrocarbon distillate of reduced mercaptan content, as well as to separate alkaline reagent solution for reuse in the process. In the liquid type process the alkaline reagent solution contains the phthalocyanine catalyst and unused hydrophilic mercapto compound. As hereinbefore set forth, additional catalyst and/or hydrophilic mercapto compound may be commingled with the alkaline solution and the mixture then is recycled for further use in the process. In the fixed bed type of process, the alkaline solution will contain unused hydrophilic mercapto compound and may be recycled for further use in the process, preferably with additional hydrophilic mercapto compound.

In some cases and particularly in the treatment of sour gasoline, a major proportion of the mercaptans is removed from the gasoline by extraction with an alkaline solution, and particularly caustic solution. This treatment readily is accomplished by either passing the sour gasoline in countercurrent contact with a descending stream of caustic solution or by passing the sour gasoline through a body of caustic solution. In a continuous process the caustic solution containing the mercapto compounds, as well as other acidic components, is subjected to regeneration by oxidizing the mercaptides to form disulfides and to recover the caustic for reuse in the process. Because of the use of the phthalocyanine catalyst, this regeneration is effected by oxidation, and air or other oxidizing gas is supplied to the regeneration zone. In accordance with the present invention, the hydrophilic mercapto compound is incorporated in the caustic solution in order to accelerate oxidation of the caustic solution. The regeneration of the caustic solution is effected at ambient temperature, although an elevated temperature which may range up to 200° F. or more may be employed, when desired. The hydrophilic mercapto compound is used in this embodiment in the same concentration as hereinbefore set forth in connection with the treating step. The regenerated caustic solution will contain disulfides formed in the regeneration, and the mixture is allowed to settle or otherwise treated to separate and remove the disulfides. The disulfides form as an upper layer and are readily removed from the regenerated caustic solution for recycling of the latter.

In still another embodiment of the present invention, and particularly when treating gasoline, a major portion of the mercaptans are removed from the gasoline in the manner hereinbefore set forth and the thus partly treated gasoline, which is reduced in mercaptan content but is not doctor sweet, is subjected to final treating by oxidizing mercaptans contained therein in the manner hereinabove set forth. The gasoline after the final treatment will be doctor sweet or substantially so and may be recovered as the final product of the combination process.

In another embodiment of the invention, the phthalocyanine catalyst may be pretreated with the hydrophilic mercapto compound. The solid phthalocyanine catalyst may be washed with an aqueous solution of the hydrophilic mercapto compound or the catalyst particles may be soaked or immersed in such a solution, excess solution drained off and the catalyst dried. It is believed that this pretreatment serves to even further enhance the activity of the phthalocyanine catalyst.

The following examples are introduced to illustrate further the novelty and utility of the present invention but not with the intention of unduly limiting the same.

*Example I*

In order to carefully follow the rate of oxidation, a synthetic mixture was prepared of isooctane containing 0.1 mole of tertiary-octyl mercaptan per liter. In a series of runs, the synthetic mixture was stirred with an aqueous 8% by weight caustic solution containing 25 parts per million of cobalt phthalocyanine sulfonate catalyst. The synthetic mixture and caustic solution containing catalyst were used in an equal volume ratio. These runs were conducted at room temperature by stirring the synthetic mixture, caustic solution and catalyst in the presence of air in a mixing zone.

In a run made in the above manner, the concentration of mercaptans after 10 minutes was 0.062 mole per liter.

In another run made in the same manner described above except that 0.075 mole per liter of mercaptoethanol were added to the reaction mixture, the concentration of mercaptans after 10 minutes was reduced to 0.025 mole per liter.

In still another run made in the same manner except that the mercaptoethanol was added in a concentration of 0.1 mole per liter, the mercaptan concentration after 11 minutes was 0.011 mole per liter.

From the above data, it will be seen that the mercaptoethanol served to considerably accelerate the oxidation of the mercaptan.

*Example II*

The runs of this example were made in a commercial stove oil having a mercaptan sulfur content of 163 parts per million. These runs were made in substantially the same manner described in Example I, except that the caustic solution contained 10% by weight of sodium hydroxide.

The first run in this series is the control run and was made without the addition of mercaptoethanol. The mercaptan sulfur was reduced from 163 parts per million to 9.7 parts per million.

The second run in this series was made in the same manner described above, except that the caustic solution contained 100 parts per million of mercaptoethanol. In this run the mercaptan sulfur was reduced to 1.7 parts per million. Here again, acceleration of sweetening was effected by the mercaptoethanol.

*Example III*

The catalyst in this example is prepared as a composite with carbon black. The composite is prepared by soaking granules of the carbon black in a caustic solution containing cobalt phthalocyanine sulfonate, draining excess solution and then drying the composite. The final catalyst contains about 8% by weight of cobalt phthalocyanine sulfonate. The catalyst is disposed as a fixed bed in a reaction zone. Another sample of the stove oil described in Example II, 10% by weight potassium hydroxide solution and air are passed upwardly through the bed of catalyst at a temperature of 125° F.

In a run made as described above, the mercaptan sulfur is reduced to about 9.4 parts per million. In another run similar to the above except that 100 parts per million of mercaptoethanol is added to the potassium hydroxide solution, the mercaptan sulfur is reduced to about 4.3. Here again, the accelerating effect of the mercaptoethanol is demonstrated.

*Example IV*

Another series of runs was made in substantially the same manner described in Example II. However, in these runs, the cobalt phthalocyanine sulfonate was used in a concentration of 50 parts per million and the temperature of treating was 120° F.

In the control run of this series, made without the addition of mercaptoethanol, the mercaptan sulfur after 15 minutes was reduced to 13 parts per million.

In another run made in substantially the same manner but containing 50 parts per million of mercaptoethanol, the mercaptan content of the stove oil after 15 minutes was 6.5 parts per million.

In still another run made in the above manner except that the mercaptoethanol was used in a concentration of of 500 parts per million, the mercaptan sulfur after 15 minutes was reduced to 1 part per million.

*Example V*

This example illustrates the novel features of the present invention in a combination extraction, caustic regeneration and sweetening process. The catalyst used in this example is vanadium phthalocyanine sulfonate and the hydrophilic mercapto compound is thioglycolic acid. Cracked gasoline having a mercaptan sulfur content of 0.1% by weight is passed upwardly in countercurrent contact to a descending stream of 12° Baumé aqueous caustic solution containing 100 parts per million of vanadium phthalocyanine sulfonate. The treated gasoline is withdrawn from the upper portion of the treating zone and the used caustic solution containing mercaptides and phthalocyanine catalyst is withdrawn from the lower portion of the treating zone. Fifty parts per million, based on the caustic solution, of thioglycolic acid are added to the used caustic solution and the mixture is sent to a regeneration zone, to which air also is supplied. In the regeneration zone, oxidation of the sodium mercaptides to form disulfides is effected. Excess air is removed from the upper portion of the regeneration zone, while the regenerated caustic solution containing disulfides, catalyst and unused thioglycolic acid is withdrawn from the lower portion of the regeneration zone and sent to a settling zone. In the settling zone an upper layer of disulfides separates and is withdrawn. The regenerated caustic solution is recycled to the extraction zone for further use in extracting mercaptans and other acidic components from cracked gasoline.

The partly treated gasoline from the extraction zone is sent to a sweetening zone. The gasoline entering the sweetening zone has a mercaptan sulfur content of about 0.009% by weight. In the sweetening zone the gasoline is passed concurrently with air and caustic solution containing vanadium phthalocyanine sulfonate and thioglycolic acid. In this zone substantially complete sweetening of the gasoline is effected. The treated gasoline is subsequently separated from caustic solution and the latter is recycled to the sweetening zone for further use in treating additional gasoline.

*Example VI*

The charge in this example is a sour commercial kerosene having a boiling range of from about 370° F. to about 520° F., a mercaptan content of about 0.24% by weight and a Saybolt color of about 30. It is treated at 118° F. with air and an equal volume of an aqueous 12° Baumé sodium hydroxide solution containing 250 parts per million of cobalt phthalocyanine disulfonate catalyst and 250 parts per million of mercaptopropanol.

The mercaptan sulfur content of the treated kerosene is reduced to about 0.003% by weight and the color of the treated kerosene is a Saybolt color of 12. In an operation similar to the above but omitting the mercaptopropanol, the mercaptan sulfur content of the treated kerosene is 0.006% and the color has depreciated to about 0. This demonstrates both the accelerating activity of the hydrophilic mercapto compound and also the beneficial effect in reducing color depreciation.

I claim as my invention:

1. A method of oxidizing a mercaptan which comprises reacting said mercaptan with an oxidizing agent in the presence of a phthalocyanine catalyst and a hydrophilic mercapto compound.

2. A method of oxidizing a mercaptan to a disulfide which comprises reacting said mercaptan with air in the presence of a solution of a phthalocyanine catalyst containing mercaptoethanol.

3. A method of treating a sour hydrocarbon distillate which comprises reacting mercaptans contained in said distillate with an oxidizing agent in the presence of a phthalocyanine catalyst and a hydrophilic mercapto compound.

4. A method of treating a sour hydrocarbon distillate which comprises reacting mercaptans contained in said distillate with air in the presence of an alkaline solution containing cobalt phthalocyanine sulfonate catalyst and mercaptoethanol.

5. A method of treating a sour hydrocarbon distillate which comprises reacting mercaptans contained in said distillate with air in the presence of an alkaline solution containing cobalt phthalocyanine sulfonate catalyst and thioglycolic acid.

6. A method of treating a sour hydrocarbon distillate which comprises reacting mercaptans contained in said distillate with air in the presence of an alkaline solution containing vanadium phthalocyanine sulfonate catalyst and mercaptoethanol.

7. A method of treating a sour hydrocarbon distillate which comprises reacting mercaptans contained in said distillate with air in the presence of an alkaline solution containing vanadium phthalocyanine sulfonate catalyst and thioglycolic acid.

8. A method of treating sour kerosene which comprises reacting mercaptans contained in said kerosene with air in the presence of caustic solution containing cobalt phthalocyanine sulfonate catalyst and mercaptoethanol.

9. A method of treating sour kerosene which comprises reacting mercaptans contained in said kerosene with air in the presence of caustic solution containing vanadium phthalocyanine sulfonate catalyst and mercaptoethanol.

10. A method of regenerating used alkaline reagent containing mercapto compounds which comprises reacting the same with an oxidizing agent in the presence of a phthalocyanine catalyst and a hydrophilic mercapto compound.

11. A method of regenerating caustic solution previously used for the removal of acidic components from hydrocarbon distillate, which comprises reacting the mercapto compounds contained in said caustic solution with air in the presence of cobalt phthalocyanine sulfonate catalyst and a hydrophilic mercapto compound.

12. A method of regenerating caustic solution previously used for the removal of acidic components from hydrocarbon distillate, which comprises reacting the mercapto compounds contained in said caustic solution with air in the presence of cobalt phthalocyanine sulfonate catalyst and mercaptoethanol.

13. A method of regenerating caustic solution previously used for the removal of acidic components from hydrocarbon distillate, which comprises reacting the mercapto compounds contained in said caustic solution with air in the presence of cobalt phthalocyanine sulfonate catalyst and mercaptopropanol.

14. A method of regenerating caustic solution previously used for the removal of acidic components from hydrocarbon distillates, which comprises reacting the mercapto compounds contained in said caustic solution with air in the presence of cobalt phthalocyanine sulfonate catalyst and thioglycolic acid.

References Cited in the file of this patent

UNITED STATES PATENTS

| | | |
|---|---|---|
| 2,996,453 | Gleim et al. | Dec. 27, 1960 |
| 3,108,081 | Gleim et al. | Oct. 22, 1963 |